US006915127B2

(12) United States Patent
Sakuma (10) Patent No.: US 6,915,127 B2
(45) Date of Patent: Jul. 5, 2005

(54) RADIO BASE STATION FOR MONITORING FAULTS OF RADIO COMMUNICATION MODEMS BASED ON CONTENT OF RECEIVED FRAMES THAT ARE RECEIVED DURING CALL CONNECTIONS

(75) Inventor: Masaki Sakuma, Kanagawa (JP)

(73) Assignee: NEC Corporation, Tokyo (JP)

( * ) Notice: Subject to any disclaimer, the term of this patent is extended or adjusted under 35 U.S.C. 154(b) by 196 days.

(21) Appl. No.: 10/437,897

(22) Filed: May 15, 2003

(65) Prior Publication Data

US 2003/0224777 A1 Dec. 4, 2003

(30) Foreign Application Priority Data

May 28, 2002 (JP) ........................................ 2002-153934

(51) Int. Cl.[7] .......................... H04Q 7/20; H04B 1/38; H04L 5/16; G01R 31/08; G06F 11/00
(52) U.S. Cl. ........................ 455/423; 370/216; 370/231; 370/253; 375/222
(58) Field of Search ..................... 455/422.1, 423–424, 455/446, 453, 502, 507, 514, 67.11, 560; 375/222, 287; 370/216, 342, 253, 230–231

(56) References Cited

U.S. PATENT DOCUMENTS

| | | | | | |
|---|---|---|---|---|---|
| 5,751,773 | A | * | 5/1998 | Campana, Jr. | 375/346 |
| 6,198,783 | B1 | * | 3/2001 | Campana, Jr. | 375/346 |
| 2003/0076875 | A1 | * | 4/2003 | Oates | 375/147 |
| 2003/0091058 | A1 | * | 5/2003 | Oates et al. | 370/442 |
| 2003/0091102 | A1 | * | 5/2003 | Oates | 375/147 |
| 2003/0091106 | A1 | * | 5/2003 | Oates | 375/150 |
| 2003/0099224 | A1 | * | 5/2003 | Oates | 370/342 |
| 2003/0128739 | A1 | * | 7/2003 | Oates et al. | 375/130 |
| 2003/0198197 | A1 | * | 10/2003 | Oates et al. | 370/320 |
| 2003/0202559 | A1 | * | 10/2003 | Oates et al. | 375/130 |
| 2003/0202566 | A1 | * | 10/2003 | Oates et al. | 375/148 |
| 2003/0231702 | A1 | * | 12/2003 | Oates et al. | 375/148 |

FOREIGN PATENT DOCUMENTS

| | | |
|---|---|---|
| JP | 5-95580 | 4/1993 |
| JP | 6-209496 | 7/1994 |
| JP | 8-97767 | 4/1996 |
| JP | 11-98092 | 4/1999 |
| JP | 11-178046 | 7/1999 |
| JP | 2001-103538 | 4/2001 |
| JP | 2001-128237 | 5/2001 |

* cited by examiner

*Primary Examiner*—Binh Kien Tieu
(74) *Attorney, Agent, or Firm*—Dickstein, Shapiro, Morin & Oshinsky, LLP.

(57) ABSTRACT

A radio base station is disclosed that monitors faults of radio communication modems based on the content of received frames that are received during call connection. The radio communication modems are mounted in units of prescribed number on signal converters of card structure and are assigned to correspond to mobile stations that perform call connections. The radio base station uses fault detection data to check the content of frames that are received during call connections for each radio communication modem, and counts the total number of received frames and the number of frames in which faults are detected. Upon termination of a call connection, the radio base station determines whether or not a fault has occurred in a radio communication modem based on the counted ratio of the number of frames in which faults are detected to the total number of received frames, and if a fault has occurred, attempts recovery control. If a radio communication modem does not recover, the radio base station deletes the radio communication modem as a candidate for next assignment. The radio base station further transmits, to maintenance personnel through the radio base station controller, a message prompting exchange of a signal conversion card in which the number of faulty radio communication modems reaches or exceeds a particular number.

8 Claims, 7 Drawing Sheets

RADIO BASE STATION FOR MONITORING FAULTS OF RADIO COMMUNICATION MODEMS BASED ON CONTENT OF RECEIVED FRAMES THAT ARE RECEIVED DURING CALL CONNECTIONS

BACKGROUND OF THE INVENTION

1. Field of the Invention

The present invention relates to a radio base station in which radio communication modems are mounted for communicating with mobile stations in a mobile communication system, to a fault recovery method for the radio communication modems, and to a mobile communication system that employs this radio base station and fault recovery method.

2. Description of the Related Art

Figure 1:
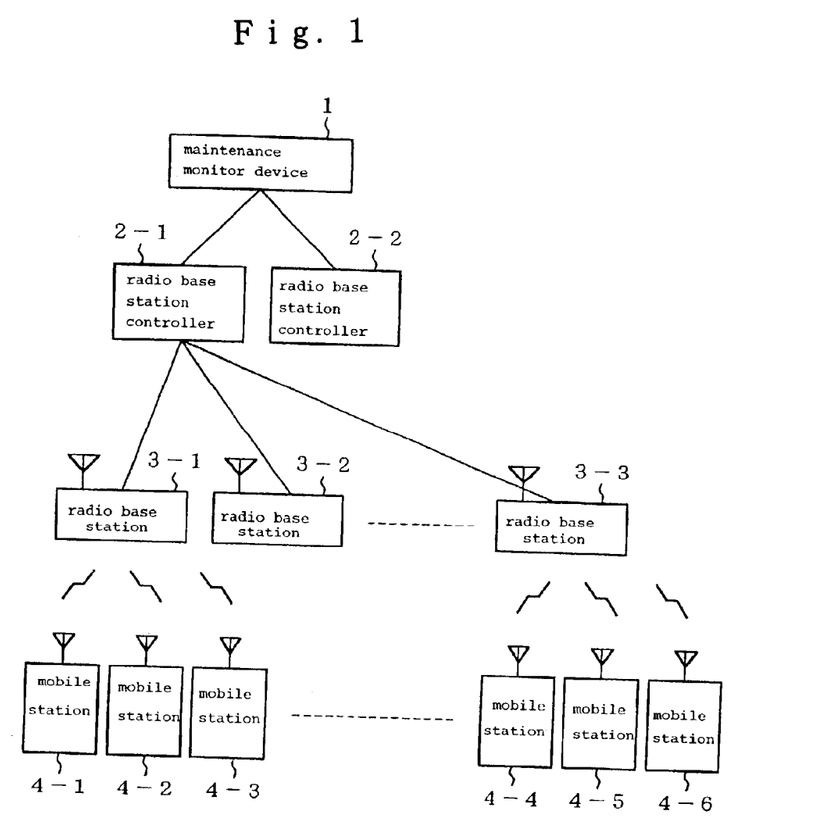
FIG. 1 is a system structural diagram showing an embodiment of the mobile communication system of the present invention.
Figure 2:
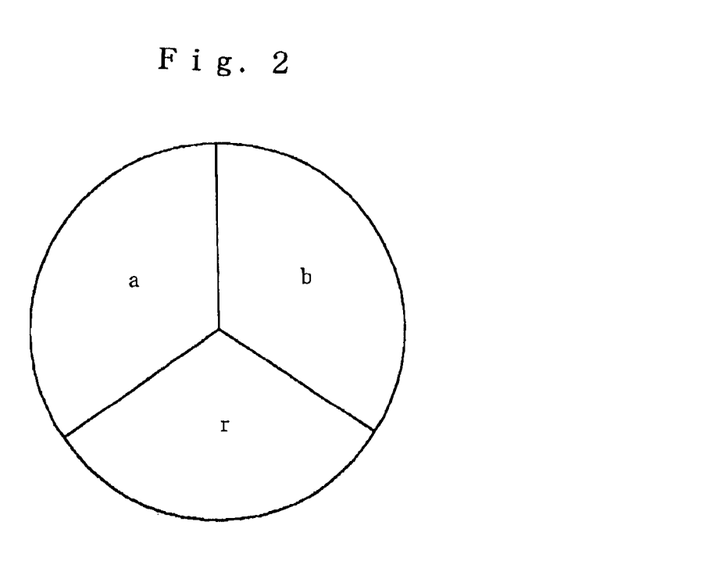
FIG. 2 shows an example of the sector structure of the radio sections of a radio base station.

We first refer to FIGS. 1 and 2 to explain the construction of a typical mobile communication system, for example, a mobile communication system that adopts a CDMA (Code Division Multiple Access) communication method.

Referring to FIG. 1, the mobile communication system is configured such that a plurality of radio base station controllers 2-1 and 2-2 are connected to one maintenance monitor device 1, a plurality of radio base stations 3 (3-1, 3-2, and 3-3) are connected to one radio base station controller 2-1, and a plurality of mobile stations 4 (4-1, 4-2, 4-3, 4-4, 4-5, and 4-6) are present within the area of one radio base station 3. Maintenance monitor device 1 is connected by wire lines to each radio base station controller 2, radio base station controllers 2 are each connected to radio base stations 3 by wire lines, and radio base stations 3 are each connected to mobile stations 4 by radio lines. Referring to FIG. 2, each radio base station 3 is of a construction for providing radio communication service in an area that is divided into three sectors a, b, and r; and realizing signal transceiving of radio sections with each mobile station 4 in sector units.

Each radio base station 3 is provided with a plurality of radio transceivers and signal converters. Radio transceivers perform radio communication with mobile stations 4 in sector and frequency units. The signal converters each include a plurality of radio communication modems for carrying out modulation (spreading) and demodulation (despreading) in the CDMA communication method, these being the signal conversion processes of each of the communication channel signals to mobile stations 4 that have passed through the radio transceivers. These signal converters have a card structure that can be attached by means of connectors to the main unit in a freely removable state. Thus, one signal converter card performs call connections with a number of mobile stations 4 equal to the number of mounted radio communication modems.

Each time radio base station controller 2 experiences a call connection failure in this type of mobile communication system, maintenance monitor device 1 is supplied with the cause of the call connection failure and the number of the radio communication modem to which the call connection was assigned at the time of the failure, whereby maintenance personnel can ascertain the state of the radio communication modems that is loaded in radio base station 3.

The above-described system of the prior art suffers from two problems. First, it is difficult to determine whether a call connection failure is due to a radio section or to a fault of a radio communication modem. In addition, the connection of a plurality of radio base stations to a single maintenance monitor device means that a large number of reports are received regarding the causes of call connection failures that occur in each radio base station, and the maintenance personnel therefore needed considerable time to fully comprehend the faulty state of a radio communication modem.

There is the additional problem that a plurality of call connections have to be performed to specify whether a problem is actually occurring in a radio communication modem, and as a result, even when a problem is occurring in a radio communication modem, the radio communication modem in which a problem is occurring has to be used to perform call connections.

SUMMARY OF THE INVENTION

It is an object of the present invention to provide a mobile communication system that performs a rapid recovery process when a fault occurs in a radio communication modem and that enables rapid resolution of the reduction of the number of radio resources, to provide a radio base station that is used in such a mobile communication system, and to provide fault recovery method of a radio communication modem of this radio base station.

In the radio communication modem fault recovery method of the present invention, the determination of whether or not a fault has occurred in each radio communication modem is realized on the side of the radio base station based on the content of the frames that are received by a plurality of radio communication modems that are mounted on a signal converter card for performing conversion of signals of radio sections and wired sections of a radio base station. When it is recognized that a fault has occurred in a radio communication modem after the termination of a call connection, the radio base station attempts the automatic recovery of the affected radio communication modem and quickly resolves the state in which the fault of the radio communication modem prevents call connection. In addition, when the number of detections of faults of a radio communication modem exceeds a particular threshold value, the radio base station prohibits use of that radio communication modem and does not assign resources for call origination or reception to that radio communication modem. Furthermore, when the total number of radio communication modems in which faults occur exceeds a particular threshold value in units of signal converter cards, maintenance personnel are prompted to exchange the card. In this way, rather than specifying a card in which failure has occurred based on the chief cause of call connection faults and the number of a radio communication modem that are indicated on a maintenance monitor device as in the prior art, the card that is to be exchanged is clearly indicated, whereby the reduction of the number of resources of radio communication modems can be quickly and easily resolved.

To explain in more concrete terms, after starting up the radio base station, a central supervisory control section for performing monitoring and control of a radio base station transmits to each signal converter operation parameters that include various threshold values for detecting radio communication modem failures. Each signal converter uses the failure detection data of the received operation parameters to check the content of received frames for current call connections in each radio communication modem and counts the total number of received frames and the number of frames in which faults are detected. Upon termination of a call connection, the signal converter determines whether a failure has occurred in a radio communication modem based on the ratio of the counted total number of received frames and the number of frames in which faults were detected, and reports to the central supervisory control unit when a fault has occurred. The central supervisory control unit entrusts the recovery control of this radio communication modem to the signal converter, and when the radio communication modem has recovered, leaves the state of that radio communication modem in the usable radio communication modem group information unchanged as "usable" and registers that radio communication modem as a candidate for a next assignment. If recovery from the fault of the radio communication modem is not achieved, the central supervisory control unit changes the state of the radio communication modem in the usable radio communication modem group information to "unusable", and deletes it as a candidate for a next assignment. Because the number of radio communication modem resources held by the radio base station is thus reduced, the maintenance personnel are prompted to exchange the card by way of the radio base station controller and maintenance monitor device, whereby the shortage in the number of radio resources is quickly resolved.

In addition, the various fault detection threshold values of the operation parameters can be updated to any value by downloading from the radio base station controller to the radio base station.

The above and other objects, features, and advantages of the present invention will become apparent from the following description with reference to the accompanying drawings, which illustrate examples of the present invention.

DETAILED DESCRIPTION OF THE PREFERRED EMBODIMENTS

We next refer to the accompanying drawings to describe the details of an embodiment of the present invention.

FIG. 1 is a system structure diagram showing an embodiment of the mobile communication system of the present invention. A plurality (two in the figure) of radio base station controllers 2 (2-1 and 2-2) are connected by way of a wired network to a single maintenance monitor device 1 that is managed by the maintenance personnel of a system. A plurality (three in the figure) of radio base stations 3 (3-1, 3-2, and 3-3) are connected by way of a wired network to each radio base station controller 2. Each of a plurality (six in the figure) of mobile stations 4 (4-1, 4-2, 4-3, 4-4, 4-5, and 4-6), which are user terminals, can freely exist in the wireless service areas of each radio base station 3. Each radio base station controller 2 is accommodated in a core network (not shown in the figure) and acts as an intermediary for communication between each mobile station 4 and user terminals of not only its own radio communication system, but also of other communication systems that are connected to the core network.

As shown in FIG. 2, each radio base station 3 divides its wireless service area into a plurality (three are shown in the figure) of sectors a, b, and r; and is connected to each mobile station 4 by a radio communication lines in sector units.

Figure 3:
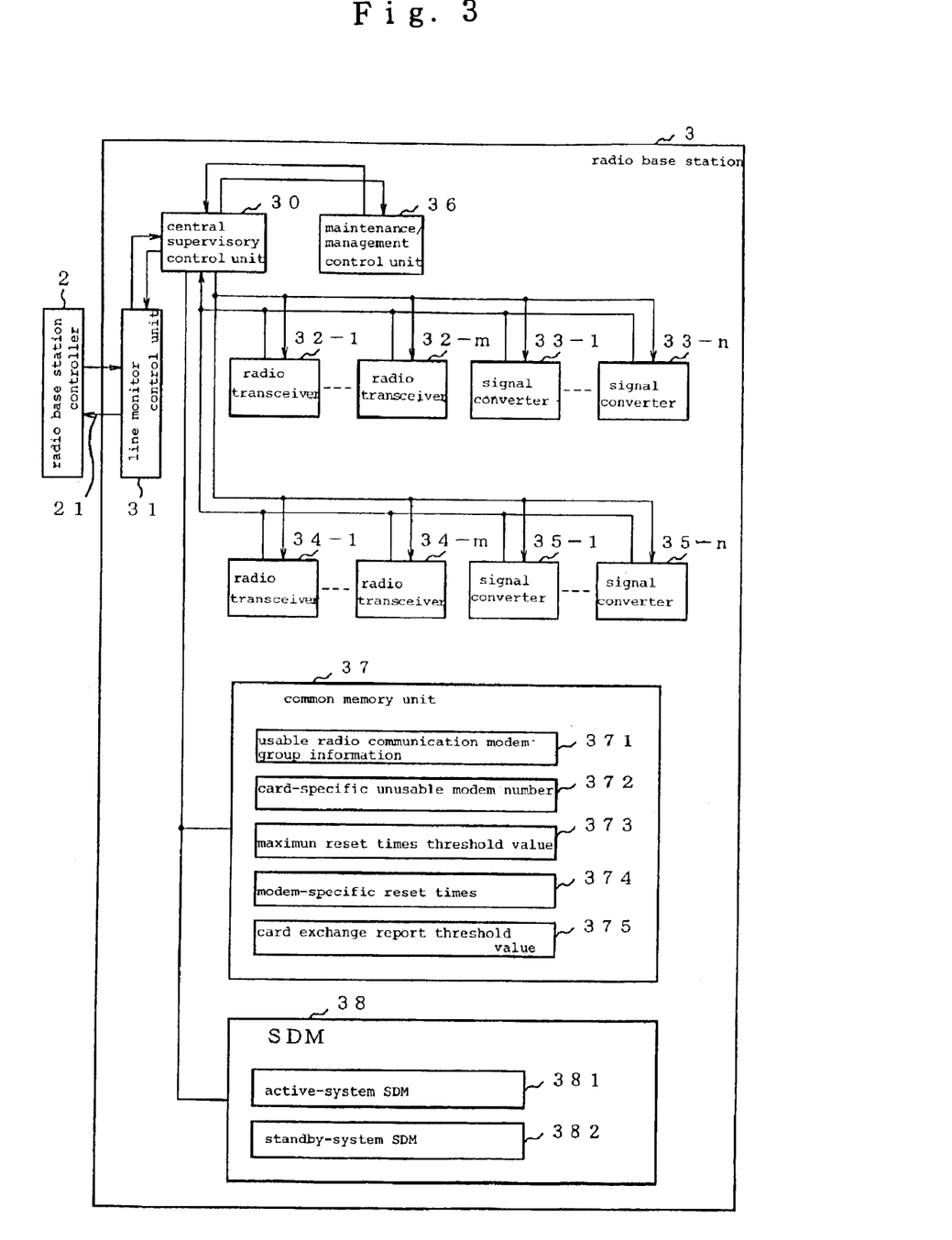
FIG. 3 is a block structural diagram showing an embodiment of the radio base station of the present invention.

FIG. 3 is a block structural diagram showing an embodiment of the radio base station of the present invention. Radio base station 3 of this example in FIG. 3 is provided with: central supervisory control unit 30; line monitor control unit 31 for communicating with radio base station controller 2, which is the host station, by way of wire network 21; a plurality of radio transceivers 32 (32-1~32-m) for transmitting and receiving signals of radio sections with mobile stations 4 at a particular radio frequency; a plurality of signal converters 33 (33-1~33-n); a plurality of radio transceivers 34 (34-1~34-m) for covering other frequencies other than those for the above-described radio transceivers 32 (32-1~32-m); a plurality of signal converters 35 (35-1~35-n) for these radio transceivers 34 (for the frequencies of these transceivers); maintenance/management control unit 36 for monitoring each of the signals in this (its own) base station; common memory unit 37 for storing various shared data in this (its own) base station; and system data memory (hereinbelow abbreviated as SDM) unit 38.

The plurality of signal converters 33 (33-1~33-n) include radio communication modems for carrying out mutual signal conversion (modulation/demodulation, spreading, despreading) between the radio frequency signals (CDMA communication method signals) for radio sections by which radio transceivers 32 transmit and receive and the signals (baseband signals) for the wired sections that connect to radio base station controller 2. System data memory unit 38 stores control programs and various shared data (operation parameters) in this base station.

Central supervisory control unit 30, line monitor control unit 31, radio transceivers 32 (32-1~32-m) and 34 (34-1~34-m), signal converters 33 (33-1~33-n) and 35 (35-1~35-n), and maintenance/management control unit 36 are each constructed in card form. In other words, each card is constructed by mounting various electronic components on a printed wiring board, and further, each card is provided with connectors on one end of this printed wiring board for connecting with the connectors on the base station main unit side (the backboard). The power supply and transmission and reception of input/output signals to and from external circuits that are necessary for the card operation are realized by way of the backboard and the connectors. Cards can be easily exchanged by inserting a card into or removing a card from the backboard. Each card is assigned a unique card number to enable identification of the cards.

Radio transceivers 32 (32-1~32-m) and 34 (34-1~34-m) are provided to correspond to each sector (for example, three sectors) and each radio frequency (for example, two frequencies). Radio interface signals between radio transceivers 32 and 34 and mobile stations 4 are CDMA mode signals, and include: (1) "pilot signals" for identifying base station (sectors); (2) "synchronizing signals" for allowing a mobile station to establish synchronization with a base station; (3) "downlink control signals" for enabling a base station to control a mobile station; (4) "uplink control signals" for allowing a mobile station to access a base station; and (5) "speech channel signals" for performing communication.

Figure 4:
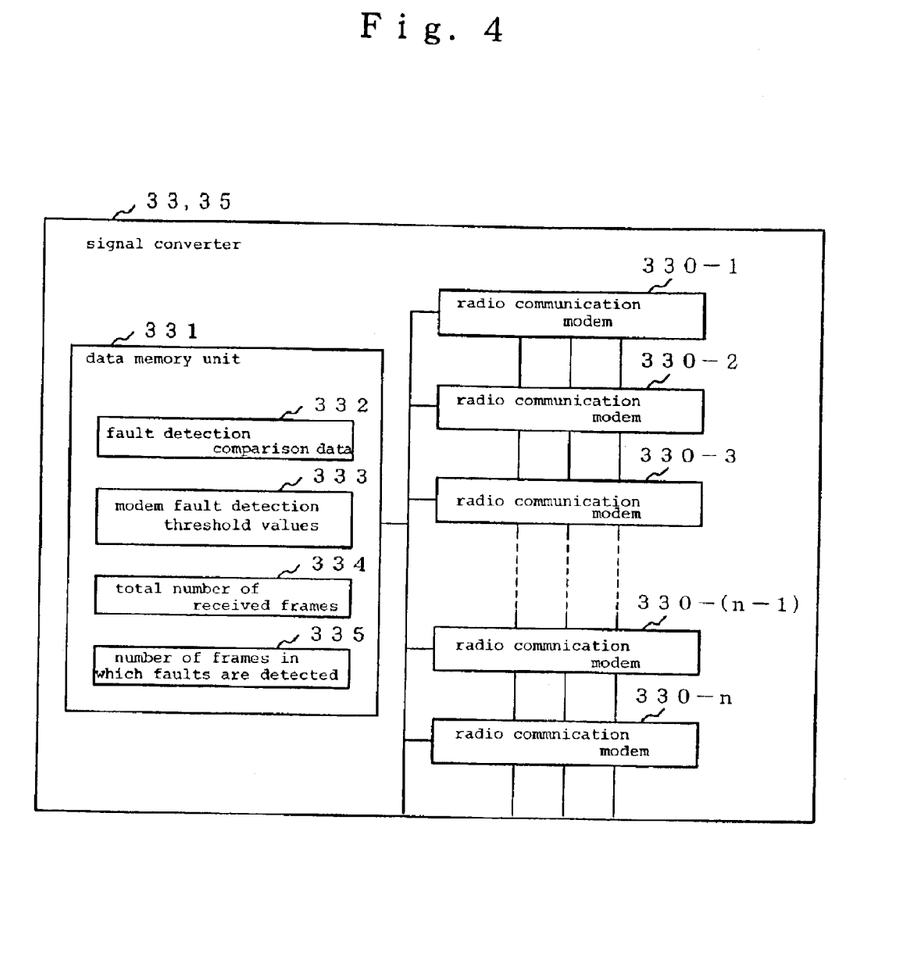
FIG. 4 shows an example of the internal construction of the signal converter that is shown in FIG. 3.

The cards of each of signal converters 33 (33-1~33-n) and 35 (35-1~35-n) are of the same construction. FIG. 4 shows an example of the internal construction of these cards.

In FIG. 4, a signal converter of this example includes a plurality (five are shown in the figure) of radio communication modems 330 (330-1~330-n) for performing modulation/demodulation (spreading/despreading) of CDMA mode signals and data memory unit 331 for storing various data.

Data memory unit 331 stores data such as: fault detection comparison data 332 for comparison with the content of frames that are received by each radio communication modem in this (its own) signal converter; modem fault detection threshold values 333 for determining whether a fault has occurred in the modem based on the ratio of the number of frames that match with the fault detection comparison data to the total number of frames that have been received up to the termination of a call connection; total number of received frames 334 for each radio communication modem for counting the total number of received frames; and number of frames in which faults are detected 335 for each radio communication modem for counting the number of frames that match with the above-described fault detection comparison data 332.

The plurality of radio communication modems 330 (330-1~330-n) are cascade-connected according to the code-division multiplexing mode for signals of radio sections and can be connected with radio transceivers 32 and 34 of the three sector portions. A radio communication modem in which a fault has occurred can be bypassed. Signals for wired sections are connected to central supervisory control unit 30 or line monitor control unit 31 by way of shared signal lines or memory and then transmitted and received at separate timings.

Each radio communication modem 330 is assigned to a particular mobile station 4 (user) through radio transceivers 32 and 34 that correspond to particular sectors and particular frequencies. When a speech channel is assigned to a user, a code that is assigned for each user is reported by a downlink control channel. Each of the signals for the pilot channel, synchronization channel, uplink control channel signal, and downlink control channel are shared with all users. Each radio communication modem 330 performs spreading of signals of a destination user using the code that corresponds to the assigned user, adds the spread signals and transmits the spread signals to a radio interface, uses the relevant code to despread signals that have been received from a radio interface, and extracts the signals from the relevant user.

Explanation next regards the flow of signals for mobile stations 4 that pass through each of signal converters 33 and 35. "Uplink control signals" and "downlink control signals" flow in order from a radio base station controller, to a line monitor control unit, to a central supervisory control unit, to a signal converter, to a radio transceiver, and finally to a mobile station. The flow of "speech channel signals" is from a radio base station controller, to a line monitor control unit, to a signal converter, to a radio transceiver, and then to a mobile station. "Pilot signals" and "synchronizing signals" are produced in signal converters and flow from a signal converter, to a radio transceiver, and then to a mobile station.

As an example, sixteen radio communication modems 330 can be mounted on one signal converter 33 or 35. Further, as an example, a maximum of 8 cards of signal converters 33 and 35 can be connected to one radio transceiver 32 or 34.

In order to maintain, manage and debug the hardware and software of its own radio base station, maintenance/management control unit 36 includes, for example, the function to monitor signals that flow within the base station, the function to write and pull up the content of an external memory flash card to SDM unit 38 (active-system SDM 381 and standby-system SDM 382), and an artificial transceiving function for monitoring signals of the radio interfaces. Maintenance/management control unit 36 may realize these functions by means of a single card, or may realize them by means of a different card for each function.

Common memory unit 37 stores data such as: usable radio communication modem group information 371 for managing the states of radio communication modems 330 (330-1~330-n) that are mounted in signal converters 33 (33-1~33-n) and 35 (35-1~35-n) that are managed by central supervisory control unit 30; card-specific unusable modem number 372 that counts in card units the radio communication modems that cannot be used; maximum reset times threshold value 373 for saving the threshold value for resets that are carried out when a radio communication modem fault has been detected; modem-specific reset times 374 for saving, in units of radio communication modems, the number of instances of resetting; and card exchange report threshold value 375 for prompting maintenance personnel to exchange a card when, in card units, the total number of radio communication modems that have become unusable has exceeded the threshold value.

SDM unit 38 includes active-system SDM 381 and standby-system SDM 382 for storing: operation parameters for flexibly altering the value of modem fault detection threshold value 333 of each of signal converters 33 (33-1~33-n) and 35 (35-1~35-n) or the value of card exchange report threshold value 375 of common memory unit 37; and the control programs for each of the cards (the central supervisory control unit, the line monitor control unit, the radio transceivers, the signal converters, and the maintenance/management control unit) that make up a radio base station.

Figure 5:
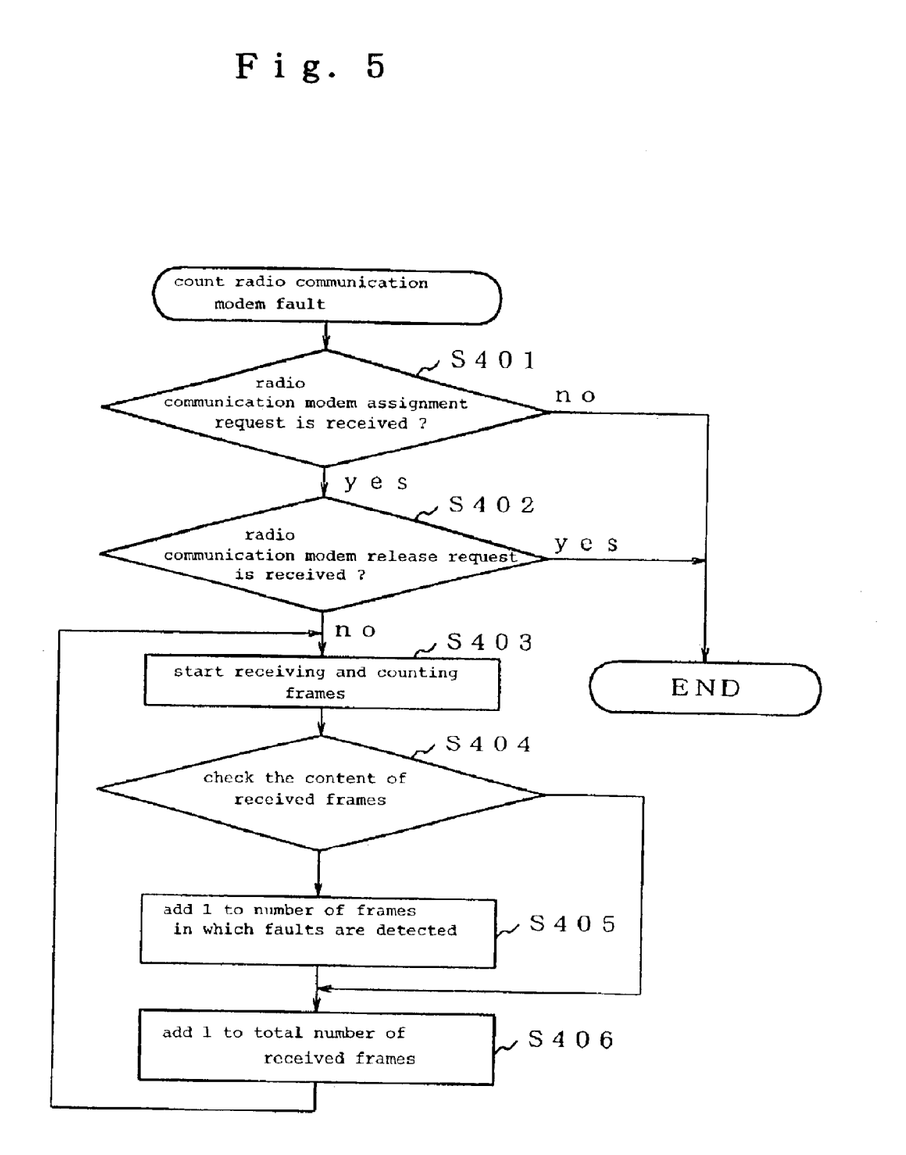
FIG. 5 is a flow chart showing operations during rating of faulty frames of the radio communication modem in a radio base station.
Figure 6:
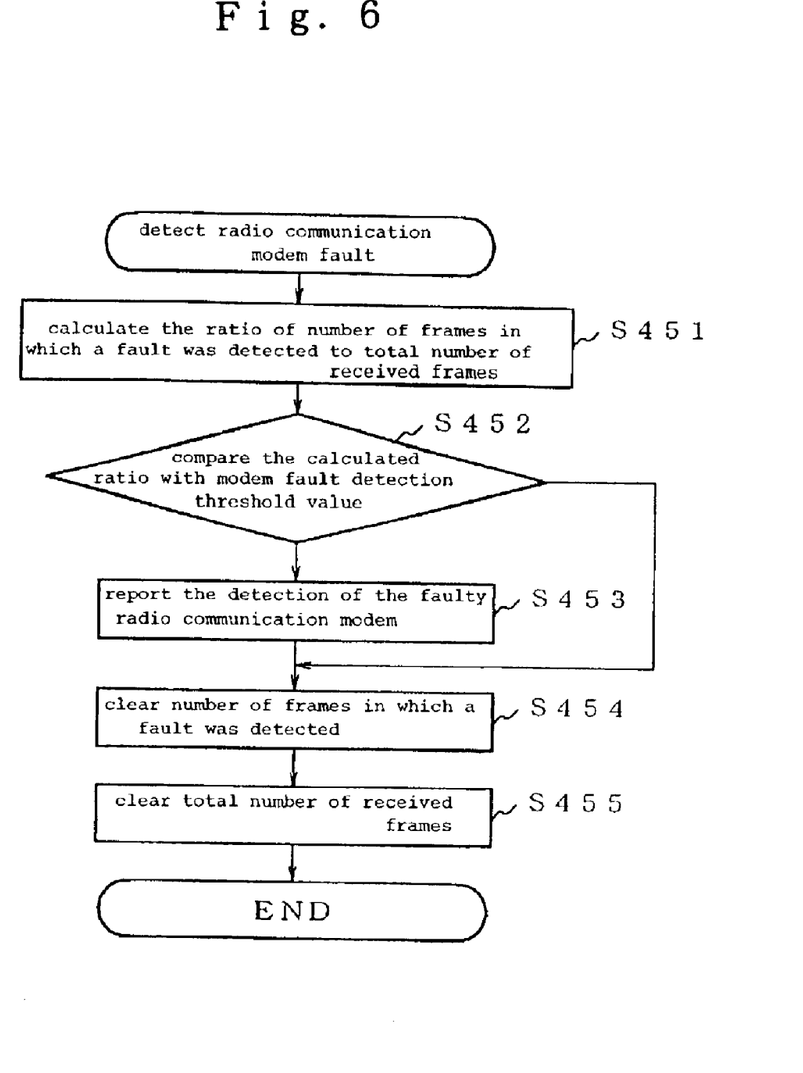
FIG. 6 is a flow chart showing the operations during fault detection of a radio communication modem in a radio base station.
Figure 7:
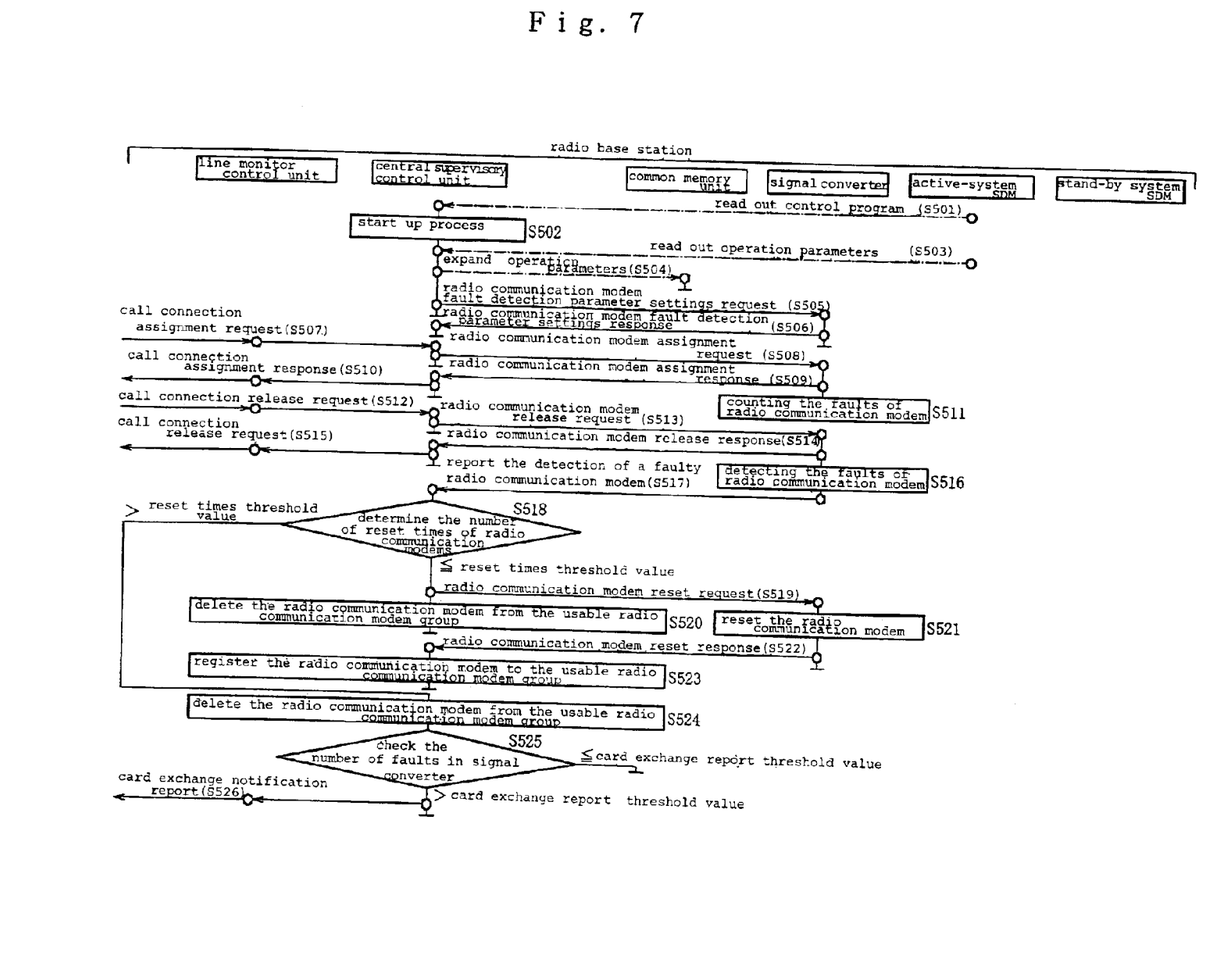
FIG. 7 shows the sequence of signals that are transmitted and received in various units from the detection of a fault until recovery of a radio communication modem in a radio base station.
Figure 8:
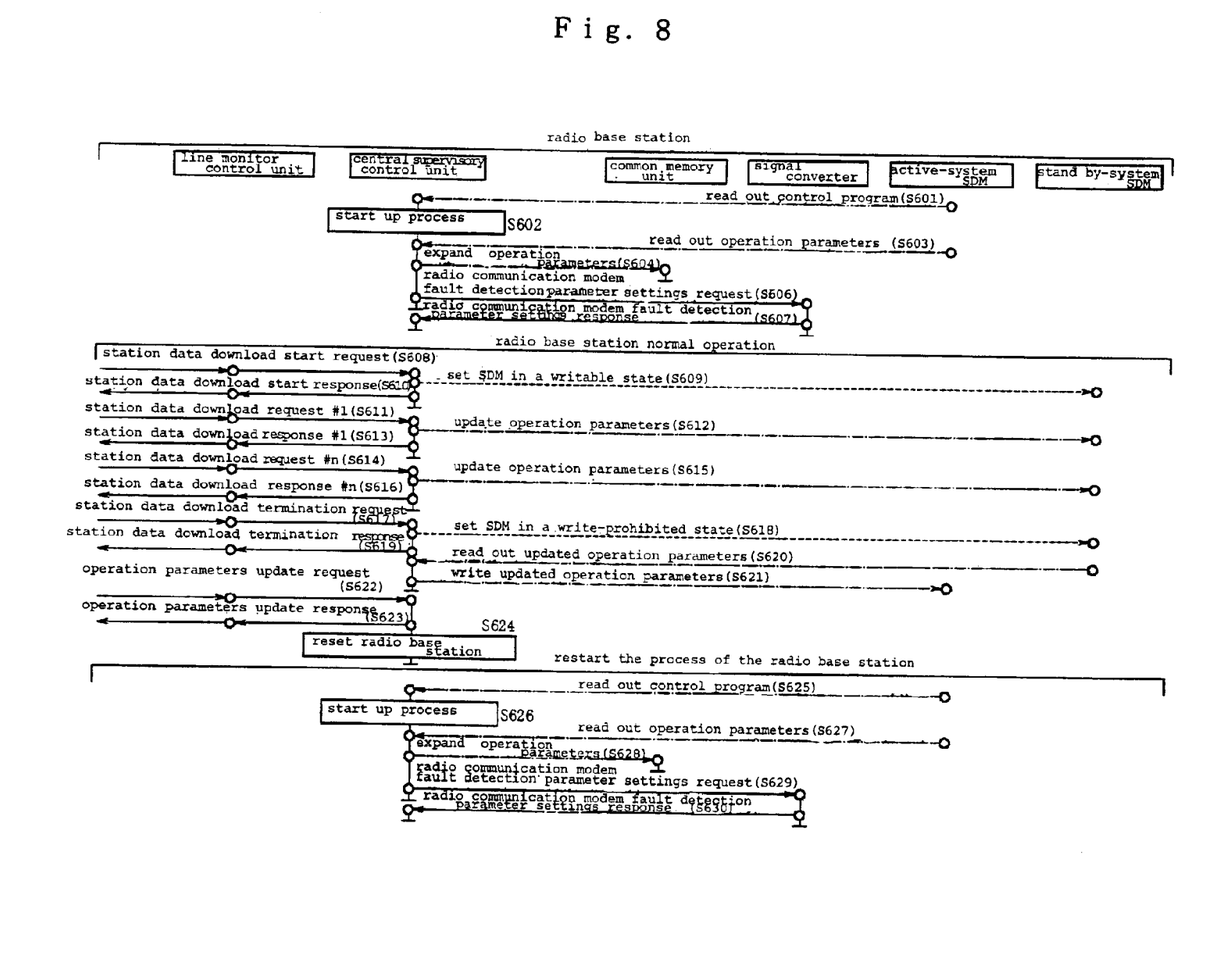
FIG. 8 shows the sequence of signals that are transmitted and received in various units when updating the various parameters that are used for fault detection of a radio communication modem in a radio base station.

We next refer to FIGS. 1–4 and FIGS. 5–8 to explain the details of the operation of the present embodiment. FIG. 5 is a flow chart showing the flow of operations when counting faulty frames of the radio communication modems in a radio base station, and FIG. 6 is a flow chart showing the flow of operations when detecting radio communication modem faults. FIG. 7 is a sequence chart showing transmission and reception in the various components of a radio base station from the detection of a fault of a radio communication modem up to recovery; and FIG. 8 is a sequence chart showing the transmission and reception of each signal in the various components when updating the various parameters that are used in detecting faults of a radio communication modem.

Before the start of system operations, control programs of the same issue and operation parameters that differ for each radio base station are written from the outside to active-system SDM 381 and the standby-system SDM 382 of each of radio base stations 3 (3-1~3-3).

In each of radio base stations 3, central supervisory control unit 30 for monitoring and controlling that (its own) radio base station, through the use of the above-described control program that has been written to active-system SDM 381, starts up line monitor control unit 31, radio transceivers 32 (32-1~32-m) and 34 (34-1~34-m), signal converters 33 (33-1~33-n) and 35 (35-1~35-n), and maintenance/management control unit 36 and thus begins operation (steps S501~S502 in FIG. 7 and steps S601–S602 and steps S625–S626 in FIG. 8).

After the completion of start-up in each radio base station 3, central supervisory control unit 30 reads out from active-system SDM 381 the operation parameters for detecting radio communication modem faults, and expands these parameters to common memory unit 37 as usable radio communication modem group information 371, maximum reset times threshold value 373, card exchange report threshold value 375, and further, fault detection comparison data 332 and modem fault detection threshold value 333 for the signal converters (steps S503–S504, S603–S604, and S627–S628).

Central supervisory control unit 30 further transmits, of the parameters that have been expanded to common memory unit 37, the operation parameters for radio communication modem fault detection for the signal converters (fault detection comparison data 332 and modem fault detection threshold value 333) to each of signal converters 33 (33-1~33-n) and 35 (35-1~35-n) and requests settings. Upon storing the received fault detection comparison data 332 and modem fault detection threshold values 333 in data memory unit 331, each of signal converters 33 and 35 transmits a setting response signal to central supervisory control unit 30 (steps S505–S506, S605–S607, and S629–S630).

The subsequent operations (from fault detection to recovery) are next described using the case of radio base station 3-1 as an example.

First, upon receiving a call connection assignment request signal from host radio base station controller 2-1 by way of the wired network in step S507 in FIG. 7, line monitor control unit 31 of radio base station 3-1 transmits the received signal to central supervisory control unit 30.

Next, in step S508, upon receiving the above-described call connection assignment request, central supervisory control unit 30 selects an available radio communication modem from among usable radio communication modem group information 371 that has been expanded in common memory unit 37, sets the state of that radio communication modem to "in use" in usable radio communication modem group information 371, and deletes this radio communication modem as a candidate for a next assignment. Central supervisory control unit 30 additionally transmits a radio communication modem assignment request signal to the signal converter, for example, signal converter 33-1, on which that radio communication modem is mounted.

Next, in step S509, signal converter 33-1 sets the parameter types that were received in the radio communication modem assignment request signal from central supervisory control unit 30 in the designated radio communication modem, for example, radio communication modem 330-3, and transmits a radio communication modem assignment response to central supervisory control unit 30.

In step S510, upon receiving the above-described radio communication modem assignment response, central supervisory control unit 30 next transmits a call connection assignment response signal to line monitor control unit 31, and line monitor control unit 31 transmits the received response signal to radio base station controller 2-1 by way of the wired network.

In the meantime, signal converter 33-1, after transmitting the assignment response signal assigning radio communication modem 330-3, begins reception of the radio channel (speech channel) that corresponds to the relevant mobile station, for example, mobile station 4-1 (user), through the relevant radio transceiver, for example, radio transceiver 32-1, and begins counting the faults of radio communication modem 330-3 in step S511.

We next refer to FIG. 5 to describe the flow of operations when counting radio communication modem faults. Upon receiving a radio communication modem assignment request in step S401, signal converter 33-1 repeats the following operations until receiving a radio communication modem release request in step S402. In other words, with the reception of each frame of a radio channel by each radio communication modem in step S403, signal converter 33-1 compares this frame with fault detection comparison data 332 (for example, all "0" data) that were stored in data memory unit 331 in step S404. When no match occurs with the fault detection comparison data (when determined to be normal), signal converter 33-1 increments only total number of received frames 334 of the radio communication modem (adds +1 to a counted value having an initial value of 0) in step S406. When a match occurs with the fault detection comparison data (in the event of a fault), signal converter 33-1 increments both number of faulty frames detected 335 and total number of received frames 334 (adds +1 to count values having an initial value of 0) of the radio communication modem in steps S405 and S406.

Next, upon receiving a call connection release request signal from radio base station controller 2-1 by way of the wired network, line monitor control unit 31 transmits the received signal to central supervisory control unit 30 in step S512.

Upon receiving the call connection release request signal, central supervisory control unit 30 determines whether the call connection that uses radio communication modem 330-3 is continuing or has terminated. If it determines that the call connection is continuing, central supervisory control unit 30 leaves the state of that radio communication modem 330-3 in radio communication modem group information 371 that has been expanded in the above-described common memory unit unchanged as "in use". If it determines that the call connection has terminated, central supervisory control unit 30 sets the state of radio communication modem 330-3 to "unused" and registers radio communication modem 330-3 as a candidate for assignment as the next radio communication modem. In the event of termination of the call connection, central supervisory control unit 30 further transmits a radio communication modem release request signal to signal converter 33-1 on which relevant radio communication modem 330-3 is mounted in step S513.

In step S514, signal converter 33-1 next halts transmission in the sector that was designated in the above-described radio communication modem release request signal from central supervisory control unit 30 and returns a radio communication modem release response signal to central supervisory control unit 30.

Upon receiving the radio communication modem release response signal in step S515, central supervisory control unit 30 transmits a call connection release response signal to line monitor control unit 31, and line monitor control unit 31 transmits the signal that was received from central supervisory control unit 30 to radio base station controller 2-1 by way of the wired network.

Signal converter 33-1, on the other hand, after transmitting the above-described radio communication modem release response signal, determines whether the call connection using radio communication modem 330-3 is being continued or has been completely finished, and if the call connection has terminated, determines that a fault has been detected in the above-described radio communication modem in step S516.

We now refer to FIG. 6 to describe the flow of operations when a fault is detected in a radio communication modem. Signal converter 33-1 first calculates the ratio of number of frames in which a fault was detected 335 to total number of received frames 334 for each radio communication modem that were counted in the process of counting radio communication modem faults in step S451. Signal converter 33-1 then compares the calculated ratio of number of frames in which a fault was detected 335 with modem fault detection threshold value 333 (for example, 90%, although this threshold value can be varied for each modem) in step S452. If the results of comparison show that the ratio of number of frames in which a fault was detected 335 falls below fault detection threshold value 333, signal converter 33-1 does not perform the radio communication modem fault recovery process (report the detection of a faulty radio communication modem to central supervisory control unit 30), but if the ratio of number of frames in which a fault was detected 335 is equal to or greater than fault detection threshold value 333, signal converter 33-1 recognizes the occurrence of a fault in that radio communication modem and reports the detection of the faulty radio communication modem to central supervisory control unit 30 in step S453. Signal converter 33-1 then clears number of frames in which a fault was detected 335 and total number of received frames 334 for that radio communication modem to "0" in steps S454 and S455 to return to the initial values. Signal converter 33-1 further sets a bypass mode for the radio communication modem in which the faults occurred to bypass the cascade connection.

Central supervisory control unit 30, upon receiving from signal converter 33-1 the above-described report of the detection of a faulty radio communication modem regarding radio communication modem 330-3 in step S517 (S453), checks the number of instances of resetting of radio communication modem 330-3 of that signal converter 33-1 from among modem-specific reset times 374 in common memory unit 37, and determines whether this number exceeds maximum reset times threshold value 373 (for example, 3 times). In other words, central supervisory control unit 30 increments the number of instances of resetting for radio communication modem 330-3 of signal converter 33-1 among modem-specific reset times 374 (adds +1 to a count value having an initial value of "0"), and checks whether the number of instances of resetting after incrementing this value exceeds maximum reset times threshold value 373 in step S518.

According to the process of step S518, if maximum reset times threshold value 373 has not been exceeded, central supervisory control unit 30 transmits a radio communication modem reset request signal to relevant signal converter 33-1 on which relevant radio communication modem 330-3 is mounted in step S519. At the same time, central supervisory control unit 30, in step S520 sets the state of use, in usable radio communication modem group information 371 that is expanded in common memory unit 37, for relevant radio communication modem 330-3 of relevant signal converter 33-1 and radio communication modems 330-1~330-2 that are connected before relevant radio communication modem (before placing in cascade connection) to "unusable" and deletes them as candidates for a next assignment. The state of use of radio communication modems 330-1 and 330-2 that are connected before relevant radio communication modem 330-3 is set to "unusable" in consideration of the potential for divergence of the setting of bypass mode at the time of resetting radio communication modem 330-3, resulting in garbling of the signals of radio communication modems 330-1 and 330-2. In the case of a construction that enables reliable bypassing of radio communication modem 330-3 that is the object of resetting from the cascade connection, it is not necessary to alter the state of use, in usable radio communication modem group information 371, for radio communication modems 330-1~330-2 that are connected before radio communication modem 330-3.

Signal converter 33-1, upon receiving the above-described radio communication modem resetting request signal, resets relevant radio communication modem 330-3 in step S521, and after completing the resetting, returns a radio communication modem reset response signal to central supervisory control unit 30 in step S522.

Upon receiving the above-described radio communication modem reset response signal, central supervisory control unit 30 sets the state of relevant radio communication modem 330-3 of relevant signal converter 33-1 (and radio communication modems 330-1 and 330-2 that are connected before radio communication modem 330-3) in usable radio communication modem group information 371 that is expanded in common memory unit 37 to "usable" and reregisters these radio communication modems as candidates for a next assignment in step S523.

If, in the processing of step S518, the number of instances of resetting of relevant radio communication modem 330-3 of relevant signal converter 33-1 in modem-specific reset times 374 in common memory unit 37 is found to have exceeded the maximum reset times threshold value 373 (three times), central supervisory control unit 30 sets the state of the relevant radio communication modem in usable radio communication modem group information 371 that is expanded in common memory unit 37 to "unusable" and increments (adds +1 to a count value having an initial value of 0) the number of unusable modems of relevant signal converter 33-1 in card-specific number of unusable modems 372 in step S524.

Central supervisory control unit 30 next checks whether the number of unusable modems of relevant signal converter 33-1 in card-specific number of unusable modems 372 after incrementing exceeds card exchange report threshold value 375 (for example, 9) in step S525. If the number of unusable modems exceeds card exchange report threshold value 375, central supervisory control unit 30 transmits a card exchange notification report signal that designates the card number of relevant signal converter 33-1 to line monitor control unit 31.

Line monitor control unit 31 transmits the card exchange notification report signal that has been received from central supervisory control unit 30 to radio base station controller 2-1 by way of the wired network in step S526. Radio base station controller 2-1 supplies a message to maintenance monitor device 1 for card exchange that corresponds to the card of the designated card number in relevant radio base station 3-1. Maintenance monitor device 1 visibly displays this message to allow maintenance personnel to easily recognize the card of the signal converter (in this case, signal converter 33-1) that should be exchanged.

If, in the processing of step S525, the number of unusable modems of relevant signal converter 33-1 in card-specific number of unusable modems 372 does not exceed card exchange report threshold value 375, no control is effected regarding a card exchange notification report signal until the card exchange notification threshold value 375 is exceeded.

Explanation next regards operations when updating operation parameters that are being used in each of radio base stations 3 (3-1~3-3). In this case as well, the explanation takes radio base station 3-1 as an example.

In accordance with the control of maintenance monitor device 1 by the maintenance personnel, a station data download start request signal is transmitted from radio base station controller 2-1 to line monitor control unit 31 of radio base station 3-1 by way of the wired network. Line monitor control unit 31 transmits the received signal to central supervisory control unit 30 in step S608 in FIG. 8.

Upon receiving the station data download start request, central supervisory-control unit 30 sets standby-system SDM 382 of SDM unit 38 in a writable state in step S609, and returns a station data download start response signal to radio base station controller 2-1 through line monitor control unit 31 in step S610.

In steps S611–S616, central supervisory control unit 30 successively writes to standby-system SDM 382 the data content of the station data download request signal that is transmitted in from radio base station controller 2-1 through line monitor control unit 31 and, upon completing writing, repeatedly transmits a station data download response signal to radio base station controller 2-1 through line monitor control unit 31.

Upon receiving a station data download termination request signal from radio base station controller 2-1 through line monitor control unit 31 in step S617, central supervisory control unit 30 returns standby-system SDM 382 to the write-prohibited state in step S618, and returns a station data download termination response signal to radio base station controller 2-1 through line monitor control unit 31 in step S619.

After transmitting the above-described station data download termination response signal, central supervisory control unit 30 reads the updated operation parameters that have been written to standby-system SDM 382, writes the updated operation parameters to active-system SDM 381, and thus establishes the same content in active-system SDM 381 and standby-system SDM 382 in steps S620–S621.

When the maintenance personnel selects an update timing of the operation parameters at his own discretion and controls maintenance monitor device 1 to request updating of the operation parameters to radio base station 3-1, radio base station controller 2-1 transmits an operation parameter update request signal to radio base station 3-1 in accordance with the operation parameter update request from maintenance monitor device 1.

Radio base station 3-1 (central supervisory control unit 30 and line monitor control unit 31), upon receiving the above-described operation parameter update request signal in step S622, returns an operation parameter update response to radio base station controller 2-1 in step S623, carries out the restart process of its own radio base station 3-1 in step S624, and updates the operation parameters in steps S625–S630.

According to the present embodiment, faults of radio communication modems are monitored by determining the content of received frames that are received during a call connection rather than by analyzing the content of a call connection failure, and as a result, not only can the occurrence of a fault in a radio communication modem be determined when a call connection is terminated, but, when a call connection is disabled due to a fault of a radio communication modem, the time until recovery of the radio communication modem can be shortened.

In addition, when a fault occurs in a radio communication modem and recovery cannot be achieved, the radio communication modem can be removed from the assignable resource group, thereby enabling a reduction of call connection failures due to the fault in the radio communication modem.

Finally, sending a message to maintenance personnel that specifies a card that carries a radio communication modem in which a fault has occurred and that prompts the exchange of the card can speed card exchange and thus minimize the reduction in the number of wireless resources held by a radio base station.

While a preferred embodiment of the present invention has been described using specific terms, such description is for illustrative purposes only, and it is to be understood that changes and variations may be made without departing from the spirit or scope of the following claims.

What is claimed is:

1. A radio base station of a mobile communication system that accommodates a plurality of mobile stations through radio lines and that control call connections, said radio base station comprising:

a line control means for controlling connections with radio base station controllers that control a plurality of radio base stations through wired lines and that mediate communication with partner mobile stations of said mobile stations;

radio transceiving means for communicating with each of said mobile stations by radio frequency signals;

a plurality of radio communication modems that are each assigned to a call connection of each of said mobile stations for performing mutual conversion between signals of radio sections for said radio transceiving means and signals of wired sections for said line control means;

fault detection comparison data storage means for storing fault detection comparison data for comparison with the content of frames that are received for each of said radio communication modems to detect faults;

total received frame counting means for counting the total number of frames that are received for each of said radio communication modems;

fault detection frame counting means for counting the number of frames in which a fault is detected of frames that are received for each of said radio communication modems based on said fault detection comparison data;

modem fault detection threshold value storage means for storing a modem fault detection threshold value, which is the maximum value of the ratio of said number of frames in which a fault is detected to said total received frames for determining a fault of a relevant radio communication modem for each of said radio communication modems; and a central control means for monitoring each of said radio communication modems, and when a call connection is terminated, calculating the ratio of said number of frames in which a fault is detected to said total received frames of the relevant radio communication modem, comparing this calculated ratio with said modem fault detection threshold value, and when this calculated ratio exceeds said modem fault detection threshold value, determining that a fault has occurred and causing the execution of an automatic recovery process of the relevant radio communication modem.

2. A radio base station according to claim 1, comprising:

a plurality of signal conversion cards that are constructed such that said plurality of radio communication modems are mounted in units of prescribed numbers on each of cards in which connectors are arranged on a printed circuit board to allow free attachment to or removal from the main body of a radio base station;

a modem-specific reset times counting means for counting instances in which resetting is performed to realize automatic recovery from a fault for each of said radio communication modems;

a maximum reset times threshold value storage means for storing a maximum reset times threshold value, which is the maximum number of instances of resetting for each of said radio communication modems;

a card-specific unusable modem counting means for counting the number of radio communication modems that have been rendered unusable for each of said signal conversion cards; and card exchange report threshold value storage means for storing a card exchange report threshold value, which is the maximum value for the number of radio communication modems that have been rendered unusable for each of said signal conversion cards for determining whether to prompt the exchange of each of said signal conversion cards;

wherein said central control means makes unusable those radio communication modems for which said number of instances of resetting for causing automatic recovery from faults has exceeded said maximum reset times threshold value, does not assign said radio communication modems that have been made unusable to said mobile stations, and further, compares the number of radio communication modems of a relevant signal conversion card that have been rendered unusable with said card exchange report threshold value, and when said number of radio communication modems that have been rendered unusable exceeds said card exchange report threshold value, transmits a message prompting the exchange of the relevant signal conversion card to maintenance personnel through said line control means and said radio base station controller.

3. A radio base station according to claim 2, further comprising means for downloading, from a radio base station controller, operation parameters that include said fault detection comparison data, said modem fault detection threshold value, said maximum reset times threshold value, and said card exchange report threshold value, and freely modifying said operation parameters.

4. A radio communication modem fault recovery method, said method being a method, in a radio base station of a mobile communication system that controls call connections of a plurality of mobile stations through radio lines under the control of a radio base station controller through wired lines, for effecting recovery from faults of a plurality of radio communication modems that perform mutual conversion of signals for radio sections and signals for wired sections, said radio communication modems being assigned to each call connection of each of mobile stations, said method comprising steps of:

storing in advance: fault detection comparison data for comparison with the content of frames that are received for each of said radio communication modems for detecting faults: and a modem fault detection threshold value, which is the maximum value of the ratio of the number of frames in which faults are detected to the total number of received frames for determining a fault of a radio communication modem for each of said radio communication modems;

for each of said radio communication modems, counting the total number of received frames when frames are received, determining whether a fault exists based on said fault detection comparison data, and if a fault exists, counting the number of frames in which faults are detected; and upon terminating a call connection of each of said radio communication modems, calculating the ratio of the number of frames in which faults are detected to the total number of received frames for each radio communication modem, comparing said calculated ratio with said modem fault detection threshold value, and, when said calculated ratio exceeds said modem fault detection threshold value, determining that a fault has occurred and performing an automatic recovery process of the relevant radio communication modem.

5. A radio communication modem fault recovery method according to claim 4, further comprising steps of:

storing in advance: a card exchange report threshold value, which is the maximum value for the number of radio communication modems that are rendered unusable for each of said signal conversion cards; and a maximum reset times threshold value, which is the maximum number of instances of resetting for each of said radio communication modems; for determining whether or not to prompt exchange of a plurality of signal conversion cards in which said plurality of radio communication modems are mounted in units of prescribed numbers on cards in which connectors are arranged on printed wiring boards to allow free installation in or removal from a radio base station main body;

counting the number of instances of resetting that are performed for automatic recovery from a fault for each of said radio communication modems;

rendering unusable those radio communication modems for which said number of instances of resetting that are performed for automatic recovery from a fault exceeds said maximum reset times threshold value, not assigning said radio communication modems that have been rendered unusable to said mobile stations, and counting the number of radio communication modems that have been rendered unusable for each said signal conversion card and comparing the counted number with said card exchange report threshold value; and when said counted number exceeds said card exchange report threshold value, transmitting a message for prompting exchange of the relevant signal conversion card to maintenance personnel through said radio base station controller.

6. A radio communication modem fault recovery method according to claim 5, further comprising a step of downloading operation parameters that include said fault detection comparison data, said modem fault detection threshold value, said maximum reset times threshold value, and said card exchange report threshold value from said radio base station controller and freely modifying said operation parameters.

7. A mobile communication system, comprising: a maintenance monitor device that is managed by maintenance personnel of a system;

a plurality of radio base station controllers that are connected by wired lines to said maintenance monitor device;

a plurality of mobile stations; and a plurality of radio base stations according to claim 2 that include a plurality of signal conversion cards in which radio communication modems for performing mutual conversion of signals for radio sections and signals for wired sections are mounted in prescribed numbers; for controlling call connections of said plurality of mobile stations through radio lines under the control of said radio base station controllers by way of wired lines;

wherein each of said radio base stations: performs a fault detection process for each of said radio communication modems within its own radio base station upon terminating a call connection, attempts an automatic recovery of radio communication modems in which faults are detected, prohibits the assignment to call connection processing of radio communication modems which have not recovered from a fault, and if the number of radio communication modems in which faults occur for each of said signal conversion cards reaches or exceeds a particular fixed value, transmits a message prompting the exchange of that signal conversion card to said maintenance monitor device through said radio base station controller.

8. A mobile communication system according to claim 7, further comprising:

means for downloading, from said radio base station controller, a control program for causing each of said radio base stations to operate and operation parameters that include said fault detection comparison data, said modem fault detection threshold value, said maximum reset times threshold value, and said card exchange report threshold value.

* * * * *